US005087679A

United States Patent [19]

Inukai et al.

[11] Patent Number: 5,087,679

[45] Date of Patent: Feb. 11, 1992

[54] POLYMERIC DIELECTRICS

[75] Inventors: Hiroshi Inukai; Noriko Kawai; Takahiro Kitahara; Shinichiro Kai; Motonobu Kubo, all of Osaka, Japan

[73] Assignee: Daikin Industries Ltd., Osaka, Japan

[21] Appl. No.: 503,970

[22] Filed: Apr. 4, 1990

[30] Foreign Application Priority Data

Apr. 7, 1989 [JP] Japan .................................. 1-88329

[51] Int. Cl.[5] .............................................. C08F 214/22

[52] U.S. Cl. .................................. 526/249; 526/255; 361/317; 428/917; 528/502

[58] Field of Search ................ 526/255, 249; 361/317; 428/917; 528/502

[56] References Cited

U.S. PATENT DOCUMENTS

| | | | |
|---|---|---|---|
| 4,173,033 | 10/1979 | Sako et al. | 526/255 |
| 4,268,653 | 5/1981 | Uchidoi et al. | 526/250 |
| 4,554,335 | 11/1985 | Sakagami et al. | 526/249 |
| 4,946,913 | 8/1990 | Kappler | 526/255 |

FOREIGN PATENT DOCUMENTS

| | | | |
|---|---|---|---|
| 0018802 | 11/1980 | European Pat. Off. | 526/255 |
| 1011577 | 12/1965 | United Kingdom | 526/255 |

OTHER PUBLICATIONS

"Piezo-and Pyroelectricity in Poly(Vinylidere Fluoride)" Bloomfield et al., Nav. Res. Rev., vol. 31, No. 5 (May 1978), pp. 1-15.

*Primary Examiner*—Joseph L. Schofer
*Assistant Examiner*—N. Sarofim
*Attorney, Agent, or Firm*—Birch, Stewart, Kolasch & Birch

[57] ABSTRACT

Polymeric dielectrics, which comprise 60 to 79 % by mole of repeating units derived from vinylidene fluoride, 18 to 22 % by mole of repeating units derived from trifluoroethylene and 3 to 22 % by mole of repeating units derived from chlorotrifluoroethylene, have high dielectric constant.

10 Claims, 1 Drawing Sheet

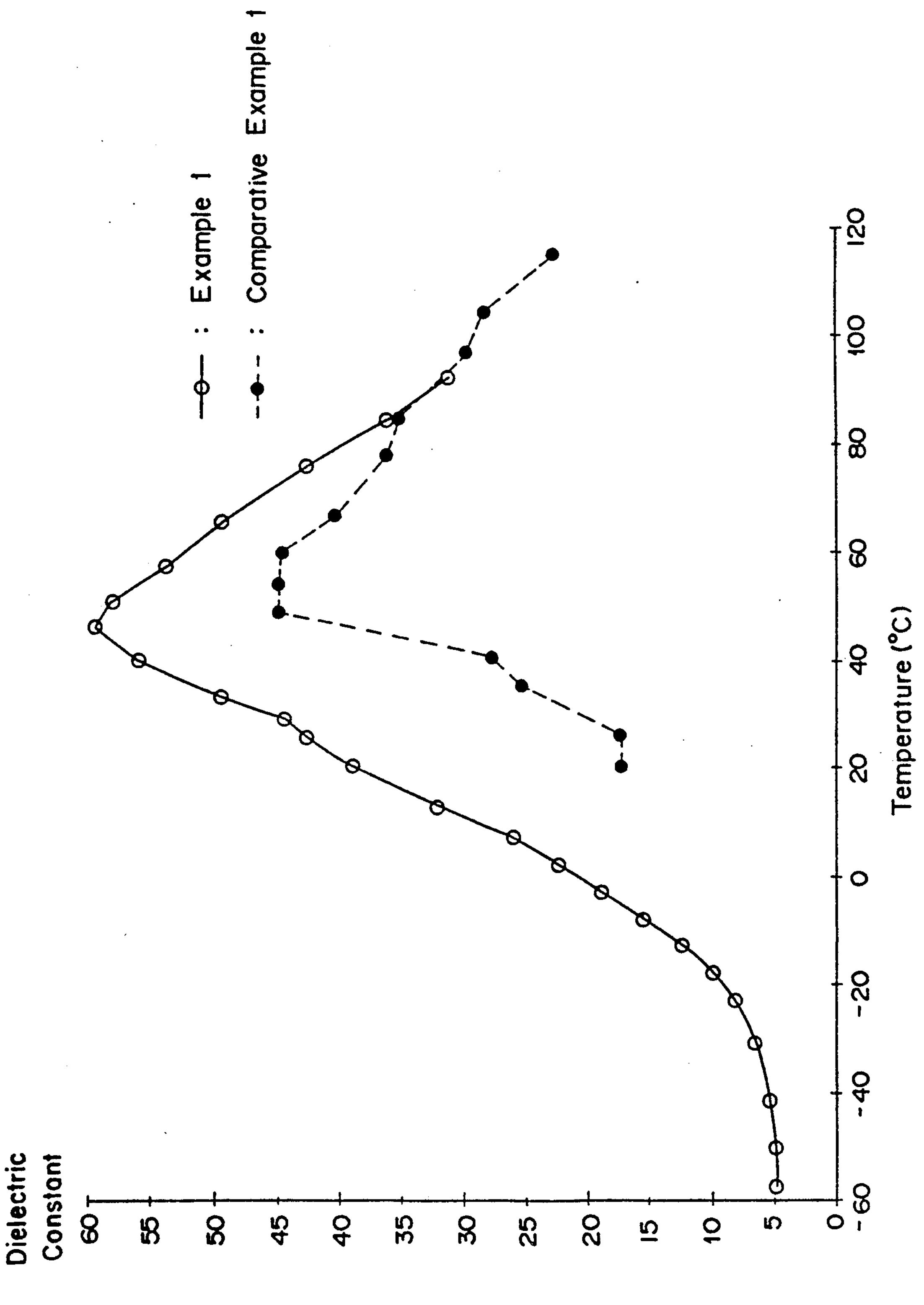
Dielectric Constant
60
55
50
45
40
35
30
25
20
15
10
5
0
-60
-40
-20
0
20
40
60
80
100
120
Temperature (°C)
: Example 1
: Comparative Example 1

POLYMERIC DIELECTRICS

BACKGROUND OF THE INVENTION

1. Field of the Invention

The present invention relates to polymeric dielectrics, particularly polymeric dielectrics which comprise vinylidene fluoride, trifluoroethylene and chlorotrifluoro-ethylene.

2. Description of the Related Art

As a polymeric dielectrics having a high dielectric constant, are known a copolymer of vinylidene fluoride and trifluoroethylene (cf. Japanese Patent Publication No. 42443/1980), a terpolymer of vinylidene fluoride, trifluoroethylene and hexafluoropropylene and a terpolymer of vinylidene fluoride, trifluoroethylene and chlorotrifluoroethylene (cf. Japanese Patent Publication No. 24884/1987).

However, these polymers have a dielectric constant of at most about 20 at 20° C. at 1 kHz. A material having a higher dielectric constant is desired so as to miniaturize a capacitor and increase an EL (electroluminescence) luminance. A large effect cannot be expected from the dielectric constant of about 20 at room temperature.

It is known to increase a dielectric constant by complexing a polymer with a ceramic, carbon black or a low molecular weight complex. However, properties can hardly be controlled and productivity is low.

SUMMARY OF THE INVENTION

An object of the present invention is to provide a polymeric dielectric having a high dielectric constant which is easily controlled.

This and other objects are achieved by a polymeric dielectric which comprises 60% to 79% by mole of repeating units derived from vinylidene fluoride, 18% to 22% by mole of repeating units derived from trifluoroethylene and 3% to 22% by mole of repeating units derived from chlorotrifluoroethylene.

BRIEF DESCRIPTION OF THE DRAWING

Figure is a graph which show relationships between a dielectric constant of films of Example 1 and Comparative Example 1 at 1 kHz and a measuring temperature.

DETAILED DESCRIPTION OF THE INVENTION

When the content of trifluoroethylene is not in the range of 18% to 22% by mole, the dielectric constant at room temperature is lower than 25.

According to the present invention, the vinylidene fluoride/trifluoroethylene/chlorotrifluoroethylene copolymer may contain at least one other copolymerizable monomer. The other copolymerizable monomer is a fluoroolefin such as tetrafluoroethylene or vinyl fluoride and may be polymerized in an amount of at most 10% by weight of the copolymer.

The copolymer usually has such a molecular weight that an intrinsic viscosity [$\eta$](solvent: methyl ethyl ketone (MEK), measured at 35° C.) of the copolymer is 0.2 to 2.0.

The copolymer can be prepared by any of the usual polymerization methods such as suspension polymerization, emulsion polymerization and solution polymerization.

In the suspension polymerization, a mixture of water and 1,1,2-trichloro-1,2,2-trifluoroethane or 1,2-dichloro-1,1,2,2-tetrfluoroethane is used as a polymerization medium, or water containing methyl cellulose as a suspension stabilizer is used. Specific Examples of polymerization initiators are the usual peroxides, for example, diisopropyl peroxydicarbonate, isobutyryl peroxide, octanoyl peroxide, $[H(CF_2)_6COO]_2$ and $(ClCF_2CFClCF_2CFClCF_2COO)_2$.

In the emulsion polymerization, $C_7F_{15}COONH_4$, $C_7F_{15}COONa$, $H(CF_2)_8COONH_4$, $H(CF_2)_6COONa$ or the like can be used as an emulsifier. A polymerization initiator, for example, a persulfate (e.g. ammonium persulfate or potassium persulfate) or hydrogen peroxide can be used, or a redox initiator can be used, which consists of said peroxide or persulfate and a reducing agent such as sodium sulfite, sodium ascorbate or a salt of transition metal, e.g., iron (II) sulfate.

In the solution polymerization, ethyl acetate, 1,1,2-trichloro-1,2,2-trifluoroethane and the like can be used as the solvent, and an initiator which is the same as in the suspension polymerization can be used.

In each of the methods of polymerization, a reaction temperature is usually in the range from 0° to 150° C., preferably 5° to 95° C. and a reaction pressure is usually lower than 50 kg/cm$^2$. In the emulsion polymerization and the suspension polymerization, pH may be kept at 7 to 9 by adding sodium hydrogencarbonate, disodium hydrogenphosphate or the like so as to prevent the decrease of pH of water during polymerization.

The copolymer of the present invention is easily dissolved in an organic solvent such as methyl isobutyl ketone, dimethylformamide, dimethylacetamide, methyl ethyl ketone and acetone, and a film can be formed from a copolymer solution by a casting method. The film of the copolymer can be formed by a thermal pressing method, a calendering method, an extruding method, a spin coating method, a water surface spreading method in addition to the casting method.

The copolymer has a preferable property in that the dielectric constant is capable of being increased by a thermal treatment. The thermal treatment may be effected at a temperature of at least 80° C., preferably from 100° to 120° C. for about one hour. The electric constant increases, for example, by 20% to 40% by the thermal treatment. In the thermal treatment, when the polymer is slowly cooled after heating, the dielectric constant further increases. A rate of cooling is preferably not higher than 10° C./min, particularly not higher than 5° C./min.

The polymeric dielectric of the present invention has a very high dielectric constant of not smaller than 30 at room temperature at a frequency of 1 kHz.

PREFERRED EMBODIMENTS OF THE INVENTION

The present invention is illustrated by following Examples.

EXAMPLE 1

In a 1.2 liter autoclave equipped with a stirrer, water (230 ml) and 1,1,2-trichloro-1,2,2-trifluoroethane (240 ml) were charged.

After the internal gas in the autoclave was sufficiently replaced with a nitrogen gas, the autoclave was evacuated and vinylidene fluoride (VdF) (35.5 g), trifluoroethylene (TrFE) (10.5 g) and chlorotrifluoroethylene (CTFE) (1.5 g) were charged.

The autoclave was warmed to 39° C. and the content in the autoclave was sufficiently stirred. Diisopropyl peroxydicarbonate (1.5g) and ethyl acetate (1.5 ml) as a molecular weight modifier were added to initiate the polymerization.

A mixture of VdF/TrFE/CTFE (molar ratio: 70/20/10) was supplied to keep a polymerization pressure at 7.5 $kg/cm^2G$ and the suspension polymerization was continued for nine hours.

Resulted copolymer was recovered, washed with water and dried at 100° C. to obtain the copolymer (80 g). The copolymer was thermally pressed at 200° C. and quenched with water to obtain a flexible film with a thickness of 3 mm.

According to chlorine analysis and $^1H$ NMR analysis, the copolymer had a VdF/TrFE/CTFE molar ratio of 73/20/7. According to DSC (DSC type II available from Perkin Elmer), the copolymer had a melting point (Tm) of 110.5° C. and a thermogravimetric decrease starting temperature of 344° C. [η](MEK, 35° C.) was 0.57. According to an LCR meter (1 kHz, 20° C.), the copolymer had a dielectric constant (ε) of 37.5 and a dielectric loss (D) of 0.046. A relationship between the dielectric constant of the film at 1 kHz and a measuring temperature is shown in Figure.

EXAMPLE 2

In the same manner as in Example 1 except that an initially charged monomers were VdF (35.0 g), TrFE (9.0 g) and CTFE (0.45 g) and a molar ratio of an additionally charged monomer mixture of VdF/TrFE/CTFE was 75/20/5, a copolymer (90 g) and a film (thickness: 3 mm) were obtained. The copolymer had a VdF/TrFE/CTFE molar ratio of 74/20/6. The copolymer had a melting point of 115.5° C. and a thermogravimetric decrease starting temperature of 340° C. [η]was 0.233. A dielectric constant and a dielectric loss are shown in Table 1.

EXAMPLE 3

In the same manner as in Example 1 except that initially charged monomers were VdF (35.0 g), TrFE (13.5 g) and CTFE (2.7 g) and a molar ratio of an additionally charged monomer mixture of VdF/TrFE/CTFE was 65/20/15, a copolymer (80 g) and a film (thickness: 3 mm) were obtained. The copolymer had a VdF/TrFE/CTFE molar ratio of 67/21/12. The copolymer had a melting point of 101° C and a thermogravimetric decrease starting temperature of 350° C. [η]was 0.77. A dielectric constant and a dielectric loss are shown in Table 1.

COMPARATIVE EXAMPLES 1 to 3

In the same manner as in Example 1 except that an initially charged monomers and an additional monomer mixture shown in Table 1 were used, copolymers and films (thickness: 3 mm) were obtained. Dielectric constants and dielectric losses are shown in Table 1. A relationship between the dielectric constant of the film of Comparative Example 1 at 1 kHz and a measuring temperature is shown in Figure.

COMPARATIVE EXAMPLE 4

In a 2.6 liter stainless steel autoclave equipped with a stirrer, water (1300 ml) and an emulsifier, ammonium perfluorooctoate (2.6 g) were charged. After the internal gas in the autoclave was sufficiently replaced with a nitrogen gas, the autoclave was evacuated and a mixture of VdF/TrFE/CTFE (molar ratio: 65/30/5) was charged in the autoclave kept at 25° C. with stirring until the pressure reached 25 $kg/cm^2G$. A 30% aqueous solution of hydrogen peroxide (4 g), $FeSO_4$ (0.152 g) and l-ascorbic acid (2.1 g) were charged to initiate the polymerization. The polymerization pressure gradually decreased and the gas was purged when the pressure decreased to 5 $kg/cm^2G$. The resulted emulsion was coagulated with potassium alum, washed sufficiently with water and dried at 120° C. to obtain a copolymer (94 g). The copolymer was thermally pressed at 200° C., and quenched with water to obtain a film with a thickness of 3 mm.

The copolymer had a VdF/TrFE/CTFE molar ratio of 65/29/6, a melting point of 135° C., a thermogravimetric decrease starting temperature of 365° C. and [η]of 0.75. A dielectric constant and a dielectric loss are shown in Table 2.

COMPARATIVE EXAMPLE 5 TO 7

In the same manner as in Comparative Example 4 except that an initially charged monomer mixture shown in Table 2 was polymerized, copolymers and films were obtained. Dielectric constants are shown in Table 2.

TABLE 1

| Example No. | Initially charged monomers (g) | | | Additional monomers (molar ratio) | | | Copolymer (molar ratio) | | | Melting point (°C.) | Thermogravimetric decrease starting temperature (°C.) | [η] | 1kHz, 20° C. | |
|---|---|---|---|---|---|---|---|---|---|---|---|---|---|---|
| | VdF | TrFE | CTFE | VdF | TrFE | CTFE | VdF | TrFE | CTFE | | | | Dielectric constant | Dielectric loss |
| 1 | 35.5 | 10.5 | 1.5 | 70 | 20 | 10 | 73 | 20 | 7 | 110.5 | 344 | 0.57 | 37.5 | 0.046 |
| 2 | 35.0 | 9.0 | 0.45 | 75 | 20 | 5 | 74 | 20 | 6 | 115.5 | 340 | 0.233 | 31.4 | 0.052 |
| 3 | 35.0 | 13.5 | 2.7 | 65 | 20 | 15 | 67 | 21 | 12 | 101 | 350 | 0.77 | 37.0 | 0.061 |
| Comp. 1 | 33.2 | 17.7 | 0.9 | 65 | 30 | 5 | 67 | 29 | 4 | 135 | 343 | 0.72 | 16.2 | 0.035 |
| Comp. 2 | 35.8 | 12.5 | 0.7 | 70 | 25 | 5 | 72 | 24 | 4 | 132 | 345 | 0.85 | 18.1 | 0.040 |
| Comp. 3 | 38.5 | 7.0 | 0.5 | 80 | 15 | 5 | 82 | 14 | 4 | 127 | 345 | 0.71 | 15.8 | 0.036 |

TABLE 2

| Example No. | Initially charged monomers (molar ratio) | | | Copolymer (molar ratio) | | | 1kHz, 20° C. | |
|---|---|---|---|---|---|---|---|---|
| | VdF | TrFE | CTFE | VdF | TrFE | CTFE | dielectric constant | dielectric loss |
| Comp. 4 | 65 | 30 | 5 | 65 | 29 | 6 | 19.6 | 0.042 |
| Comp. 5 | 50 | 54 | 5 | 50 | 45 | 5 | 16.6 | — |
| Comp. 6 | 60 | 30 | 10 | 60 | 31 | 9 | 20.4 | — |

TABLE 2-continued

| Example No. | Initially charged monomers (molar ratio) | | | Copolymer (molar ratio) | | | 1kHz, 20° C. | |
|---|---|---|---|---|---|---|---|---|
| | VdF | TrFE | CTFE | VdF | TrFE | CTFE | dielectric constant | dielectric loss |
| Comp. 7 | 75 | 15 | 10 | 75 | 14 | 11 | 17.1 | — |

EXAMPLES 4 AND 5 AND COMPARATIVE EXAMPLE 8

In the same manner as in Example 1 and 2 and Comparative Example 1 except that the copolymer was slowly cooled after thermally pressed, films were obtained.

That is, the films of Examples 4 and 5 and Comparative Example 8 were prepared by thermally pressing the copolymers obtained in Examples 1 and 2 and Comparative Example 1 at 200° C. and then slowly cooling the copolymer films left in a mold to a room temperature. In these cases, a temperature of the sample was about 50° C. after about 30 minutes. A dielectric constant and a dielectric loss of each film are shown in Table 3.

TABLE 3

| Example No. | Copolymer (molar ratio) | | | 1kHz, 20° C. | |
|---|---|---|---|---|---|
| | VdF | TrFE | CTFE | Dielectric constant | Dielectric loss |
| 4 | 73 | 20 | 7 | 46.7 | 0.052 |
| 5 | 74 | 20 | 6 | 40.6 | 0.060 |
| Comp. 8 | 67 | 29 | 4 | 22.5 | 0.047 |

What is claimed is:

1. A polymeric dielectric which comprises 60% to 79% by mole of repeating units of vinylidene fluoride, 18% to 22% by mole of repeating units of trifluoroethylene and 3% to 22% by mole of repeating units of chlorotrifluoroethylene.

2. A thermally treated polymeric dielectric of the polymeric dielectric defined in claim 1.

3. A polymeric dielectric of the polymeric dielectric defined in claim 1 which has been heated and slowly cooled.

4. The polymeric dielectric according to claim 1, in which said polymeric dielectric further comprises tetrafluorethylene or vinyl fluoride in an amount of at most 10% by weight of the polymeric dielectric.

5. The polymeric dielectric according to claim 1, in which said polymeric dielectric having an intrinsic viscosity of 0.2 to 2.0 when measured in methyl ethyl ketone at 35° C.

6. The thermal treated polymer dielectric according to claim 2, wherein the thermal treatment has been effected at a temperature of at least 80° C.

7. The thermal treated polymeric dielectric according to claim 2, wherein the thermal treatment has been effected at a temperature of from 100° to 120° C.

8. The polymeric dielectric according to claim 3, wherein the cooling has been effected at a rate of not higher than 10° C./min.

9. The polymeric dielectric according to claim 3, wherein the cooling has been effected at a rate of not higher than 5° C./min.

10. The polymeric dielectric according to claim 1, said polymeric dielectric having a dielectric constant of not smaller than 30 at room temperature at a frequency of 1 kHz.

* * * * *